United States Patent [19] [11] 4,120,626
Keller [45] Oct. 17, 1978

[54] DEVICE FOR THE CONTINUOUS PRODUCTION OF FOAM BLOCKS OF RECTANGULAR CROSS-SECTION

[75] Inventor: Heinrich Keller, Troisdorf, Germany
[73] Assignee: Maschinenfabrik Hennecke GmbH, Leverkusen, Germany
[21] Appl. No.: 812,040
[22] Filed: Jul. 1, 1977
[30] Foreign Application Priority Data
Jul. 17, 1976 [DE] Fed. Rep. of Germany ....... 2632302
[51] Int. Cl.² ............................................. B29D 27/04
[52] U.S. Cl. ............................ 425/89; 264/DIG. 84; 425/224; 425/363; 425/817 C
[58] Field of Search .................... 264/51, 52, 54, 46.3; 425/4 C, 817 C, 89, 224, 329, 115, 471, 363, 364 R

[56] References Cited
U.S. PATENT DOCUMENTS
3,240,846 3/1966 Voelker ........................ 425/817 C X
3,984,195 10/1976 DelCarpio .................... 425/817 C X

*Primary Examiner*—Francis S. Husar
*Assistant Examiner*—Mark Rosenbaum
*Attorney, Agent, or Firm*—Gene Harsh; Joseph C. Gil; William E. Parry

[57] ABSTRACT

The instant invention is directed to an improved device for the continuous production of foam blocks of rectangular cross-section, comprising an endless conveyor belt with side walls, means for supplying a covering sheet to the upper surface of the upper rim of the conveyor belt and the side walls, a charging device for supplying a foamable reaction mixture to the upstream end of the said upper rim of the conveyor belt, and a plurality of mold covers which are placed along the foaming area and each of which is suspended from a guiding device, the improvement wherein each guiding device comprises first and second links secured to mounting means, a diagonally extending rod pivotally connected at its lower end to the mold cover, a first lever pivotally connected at one end to the first link and pivotally connected at its opposite end to a point on the rod intermediate its ends, and a second lever pivotally connected at one end to the second link downstream of the pivotal connection between the first lever and the first link and pivotally connected at its opposite end to the upper end of the rod.

5 Claims, 3 Drawing Figures

DEVICE FOR THE CONTINUOUS PRODUCTION OF FOAM BLOCKS OF RECTANGULAR CROSS-SECTION

BACKGROUND OF THE INVENTION

In general, devices are known for the continuous production of foam blocks having a rectangular cross-section. These known devices comprise an endless conveyor belt with side walls wherein the carrying run of the conveyor belt and the side walls are adapted to be covered with a film, a distributing device for a foamable reaction mixture which is located over the inlet end of the conveyor belt, and a plurality of mold covers which are placed along the foaming area and fixed to guiding mechanisms.

The mold covers provide for an even surface of the nascent foam block. They must be adaptable to the height of the reacting reaction mixture or of the foam which is being formed, without the bearing pressure being altered. This necessarily means that the position of the mold covers must vary with variations in the height of the surface of the foam block which is being formed, which usually results in a variation of the angle of pitch or a displacement in the foaming area.

A device has therefore been proposed in which the mold covers are hung on pivotal levers and the bearing pressure is controllable by means of counterbalances. At the beginning and end of the foaming process, and during variation in the height of the foam during production, the mold covers experience, in addition to vertical movement, a movement in or opposite to the conveying direction of the conveyor belt. It has been found that this movement may be as much as 600 mm or more. Thus a disadvantageous pushing or pulling force component is exerted on the surface of the foam which may cause compression and cracks.

In other known devices, the mold covers are held in guiding mechanisms by means of vertical rods. The bearing pressure is controlled by adjustable springs or by counter-balances. These devices have proved particularly disadvantageous, since during adjustment in height, friction in the guiding mechanisms of the rods causes an appreciable hysteresis of the bearing forces. Considering the low bearing force, of from 2 to 6 mbar, required for the mold covers on the foam which is being formed, this phenomenon is undesirable.

Characteristic of these devices are those disclosed in U.S. Pat. No. 3,984,195.

An object of the invention is to provide a device in which the mold covers may reciprocate in a direction which is as vertical as possible and be free of interfering forces.

DESCRIPTION OF THE INVENTION

Figure 1:
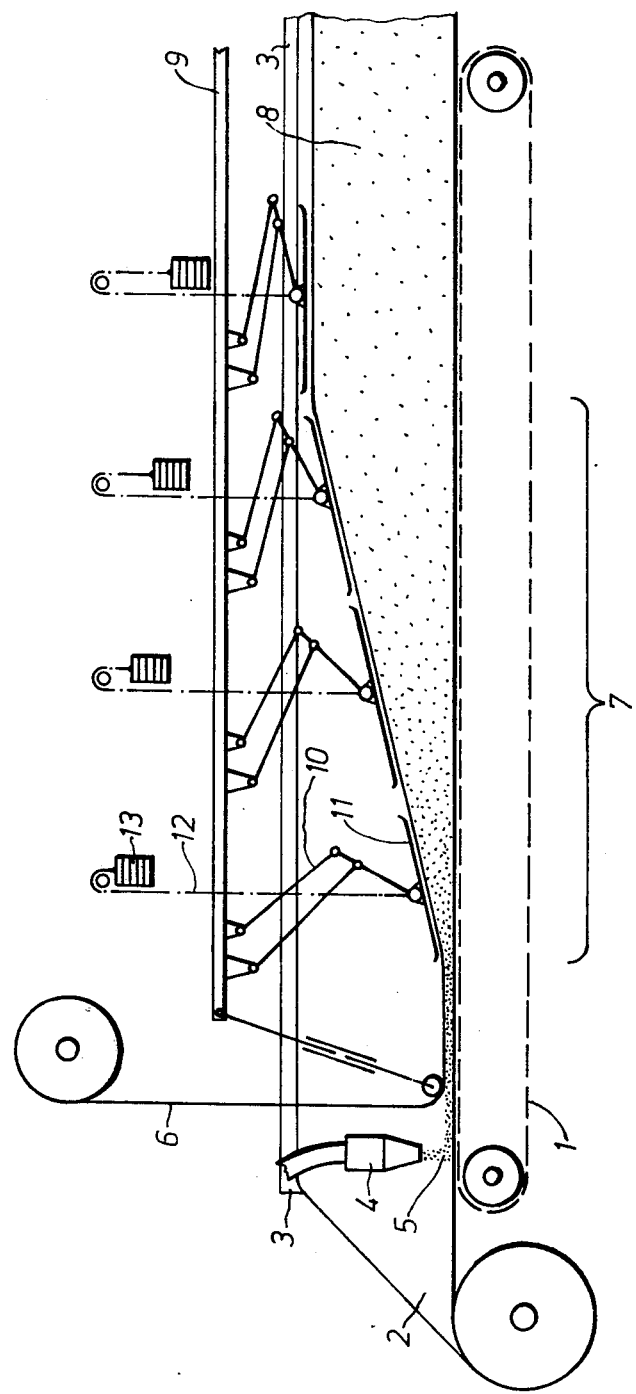
FIG. 1 represents a side view of the improved apparatus of the instant invention.

The instant invention is directed to a device for the continuous production of foam blocks of rectangular cross-section, comprising an endless conveyor belt with side walls, means for supplying a covering sheet to the upper surface of the upper rim of the conveyor belt and the side walls, a charging device for supplying a foamable reaction mixture to the upstream end of the said upper rim of the conveyor belt, and a plurality of mold covers which are placed along the foaming area and each of which is suspended from a guiding device, the improvement wherein each guiding device comprises first and second links secured to mounting means, a diagonally extending rod pivotally connected at its lower end to the mold cover, a first lever pivotally connected at one end to the first link and pivotally connected at its opposite end to a point on the rod intermediate its ends, and a second lever pivotally connected at one end to the second link downstream of the pivotal connection between the first lever and the first link and pivotally connected at its opposite end to the upper end of the rod.

The five-link mechanisms, each comprising respective first and second links, a rod, and first and second levers, move the mold covers up and down substantially vertically. Interfering forces through hysteresis phenomena or through longitudinal displacement of the mold cover do not occur. If the effect of a force on the forming foam is desired, which is different from the weight of the mold cover and effective weight of the five-link mechanism, the five-link mechanisms may be equipped with variable counter-weights or adjustable, relieving springs, as is the case in known constructions. The five-link mechanisms which are used according to the invention allow a smaller number of mold covers, whereby the outlay for construction and operation is considerably reduced. There is also a lesser occurrence of interference. During operational interferences and interruption the mold covers may be rapidly raised by means of the five-link mechanisms and later re-lowered.

The five-link mechanism is preferably constructed at least partially in duplicate, and connecting transverse bars can therefore be provided. This has the advantage of increased stability and is of particular advantage with mold covers which have a greater extension transversely to the conveying direction. Obviously, the complete doubled construction of the five-link mechanism with a corresponding interval between the two joints offers the highest torsional rigidity.

In a particular embodiment of the invention the length $L_1$ of the oscillating lever which engages in the center joint of the rod, the length $L_2$ of the longer lever arm of the rod, the acute angle $\alpha$ which the pivotal lever in the conveying direction makes with the horizontal, and the angle $\beta$, which the rod makes with the horizontal, are given by the following equation:

$$\sqrt{\frac{L_1}{L_2}} = \frac{\sin \beta/2}{\sin \alpha/2}.$$

If this condition is adhered to, the joint which is arranged on the mold cover moves during the raising or lowering of the mold cover along a substantially vertical path.

The length $L_1$ of the first pivotal lever in the conveying direction and the length $L_2$ of the longer lever arm of the rod are preferably given by $$L_1 \approx 2 L_2.$$

The previous equation can then be simplified to $$\sin \beta/2 = \sqrt{2} \cdot \sin \alpha/2.$$

This dimensioning allows a mold cover to be used which, based on the longitudinal axis of the device, allows a central arrangement of the joint on the mold cover.

The length of the upper lever arm of the rod is preferably approximately 0.15 times the length of the oscillating lever which engages in the center joint of the rod.

In one embodiment of the invention, the fixed rotating joint, in which the other oscillating lever engages, lies in the intersection of the angular bisectors, which may be formed between the required different spatial positions of the joint which is arranged on the upper end of the rod.

Based on the above-mentioned details, the following solution is produced:

$$\frac{\alpha \quad 10° \quad 25° \quad 40°}{\beta \quad 14° \quad 36° \quad 58°}$$

If, for constructional reasons, a shorter second pivotal lever, which engages in the joint at the upper end of the rod, has to be used, a deviation of the path of the combination joint of the mold cover and of the rod from the perpendicular is produced, the deviation varying in size according to the reduction in size of the second pivotal lever. Providing this deviation is not too large, it may be tolerated without causing marked disturbances.

Reference will now be made to the drawings.

FIG. 1 shows a base sheet 2 made of paper and which is bent upwardly at the side walls 3 and is positioned on an endless conveyor belt 1. A mixing and charging device 4 for a foamable polyurethane reaction mixture 5 is placed adjacent the inlet end of the upper rim of the conveyor belt 1. The reaction mixture 5 is covered by a paper sheet 6. A foam block 8 is formed in a foaming area 7. A support frame 9 is placed above the foaming area 7, upon which five-link mechanisms 10 are hung, which maintain mold covers 11 of the forming foam. If desired, cables 12 with counter-weights 13 provide for the adjustment of the forces which the covers 11 exert on the forming foam. These forces may, of course, be regulated by other means apart from counterweights, such as mechanical or hydraulic springs. Alternatively, the five-link mechanisms 10 may be arranged in such a way that the rod 22 (FIG. 2) points in a direction opposite to the conveying direction.

Figure 2:
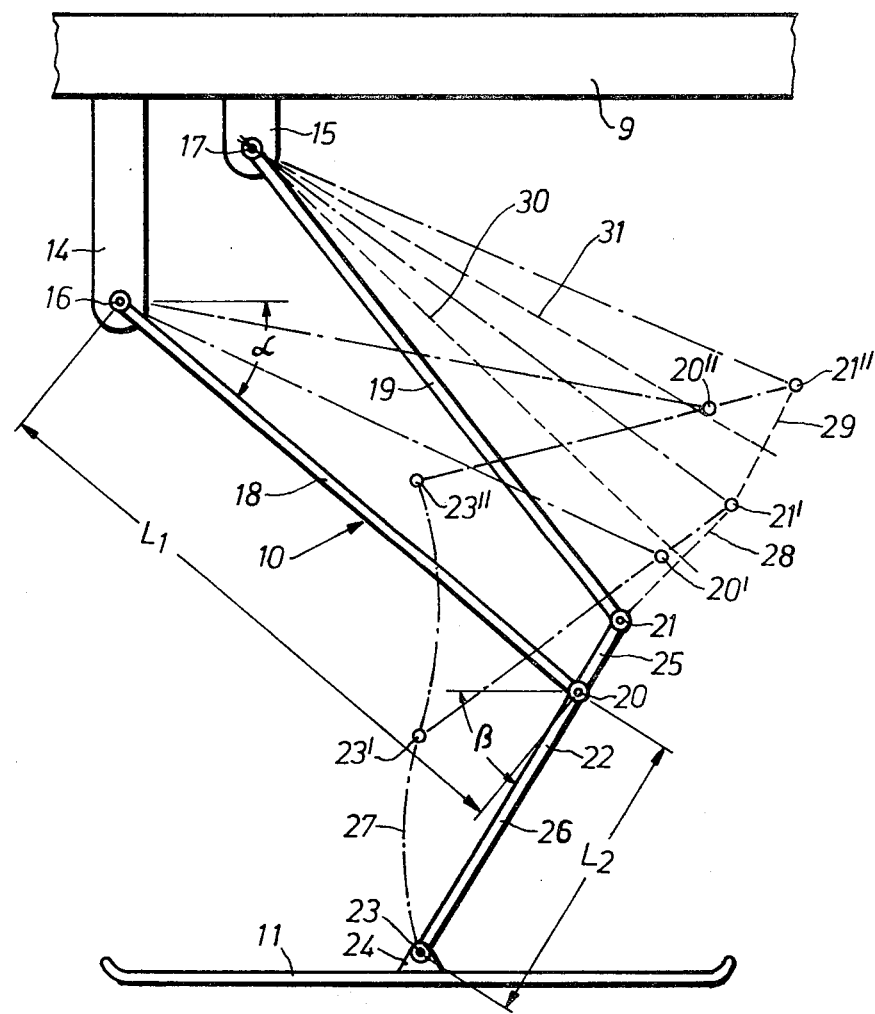
FIG. 2 represents an expanded view of the five-link mechanism of FIG. 1, in a variety of positions.

In FIG. 2, fixing devices 14 and 15 having joints 16 and 17 respectively are secured on the mounting frame 9. All the joints may conveniently comprise a pin and eye. A pivotal lever 18 is connected to the joint 16. A second pivotal lever 19 is connected to the joint 17. The opposite ends of the levers 18 and 19 engage in joints 20, 21 of a rod 22. At its lower end this rod has another joint 23, on which a mold cover 11 is fixed by means of a fixing device 24. The joint 20 divides the rod 22 into an upper lever arm 25 and lower lever arm 26. The pivotal lever 18 has a length $L_1 = 2.0$ m and forms an angle $\alpha = 40°$ with the horizontal in the position shown. The lower lever arm 26 of the rod 22 has the length $L_2 = L_1/2 = 1.0$ m. The rod 22 forms an angle $\beta$ of 58° with the horizontal in the position shown. The five-link mechanism 10 is also shown in two other positions. The spatially movable joints are given the references 23', 20' and 21' in the first alternative position. In the second alternative position, they have the references 23'', 20'' and 21''. It is clear from this that the joint 23 moves along an approximately vertical path 27. The position of the fixed joint 17 is found by connecting the joint positions 21 and 21' by a straight line 28, connecting the positions 21' and 21'' by a straight line 29, and by forming the perpendicular angular bisectors 30 and 31 thereon. Their intersection then produces the position of the joint 17.

Figure 3:
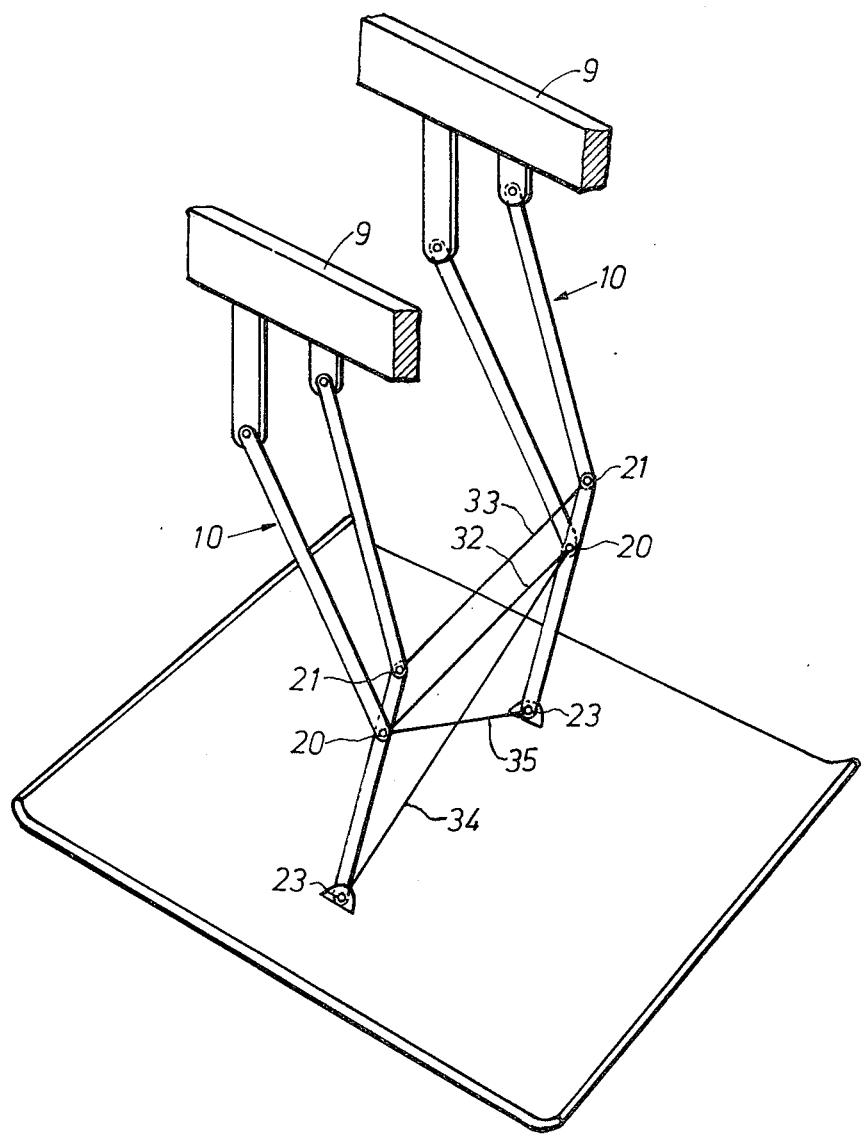
FIG. 3 represents a perspective view of a mold cover having a double five-link mechanism.

In FIG. 3, two five-link mechanisms 10 are placed parallel to each other on the frame 9. Their joints 20 are connected together by a transverse bar 32 and their joints 21 are connected together by a transverse bar 33. The joints 20 and 23 can also be joined together by diagonal struts 34 and 35.

I claim:

1. In a device for the continuous production of foam blocks of rectangular cross-section, comprising an endless conveyor belt with side walls, means operatively associated with said conveyor for supplying a covering sheet to the upper surface of the upper rim of the conveyor belt and the side walls, a charging device for supplying a foamable reaction mixture to the upstream end of the said upper rim of the conveyor belt, and a plurality of mold covers which are placed along the foaming area and each of which is suspended from a guiding device, the improvement wherein each guiding device comprises mounting means, first and second links secured to said mounting means, a diagonally extending rod pivotally connected at its lower end to the mold cover, a first lever pivotally connected at one end to the first link and pivotally connected at its opposite end to a point on the rod intermediate its ends, and a second lever pivotally connected at one end to the second link downstream of the pivotal connection between the first lever and the first link and pivotally connected at its opposite end to the upper end of the rod.

2. A device according to claim 1, wherein each mold cover is additionally suspended by at least part of a second guiding device and at least one transverse bar connects the two guiding devices together.

3. A device according to claim 1, wherein the length ($L_1$) of the first lever, the length ($L_2$) between the said point on the rod and the pivotal connection between the rod and the mold cover, the angle $\alpha$ between the first lever and the horizontal, and the angle $\beta$ between the rod and the horizontal, are given by the following equation:

$$\sqrt{\frac{L_1}{L_2}} = \frac{\sin \beta/2}{\sin \alpha/2}.$$

4. A device according to claim 3, wherein the said length ($L_1$) is twice the said length ($L_2$).

5. A device according to claim 3, wherein the distance between the said point on the rod and its pivotal connection to the second lever is about 0.15 times the length of the first lever.

* * * * *